(12) United States Patent
Eich et al.

(10) Patent No.: US 8,089,351 B2
(45) Date of Patent: Jan. 3, 2012

(54) INSTRUMENT CLUSTER LENS INFORMATION, TELLTAILS, AND LIGHTING

(75) Inventors: Rodger W. Eich, Holland, MI (US); James T. Hotary, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 567 days.

(21) Appl. No.: 11/664,890

(22) PCT Filed: Oct. 5, 2005

(86) PCT No.: PCT/US2005/035749
§ 371 (c)(1), (2), (4) Date: Dec. 22, 2008

(87) PCT Pub. No.: WO2006/041876
PCT Pub. Date: Apr. 20, 2006

(65) Prior Publication Data
US 2009/0121853 A1    May 14, 2009

Related U.S. Application Data

(60) Provisional application No. 60/616,535, filed on Oct. 6, 2004.

(51) Int. Cl.
*B60Q 1/00* (2006.01)
*G08B 5/00* (2006.01)
*G09F 13/12* (2006.01)
*G01D 11/28* (2006.01)

(52) U.S. Cl. .......... 340/461; 340/425.5; 340/815.42; 340/815.47; 340/815.55; 362/23; 362/26; 362/551; 362/615

(58) Field of Classification Search .......... 340/461
See application file for complete search history.

(56) References Cited

U.S. PATENT DOCUMENTS

| | | | |
|---|---|---|---|
| 3,270,201 A | 8/1966 | Hardesty | |
| 5,032,711 A | 7/1991 | Yamada | |
| 5,371,510 A | 12/1994 | Miyauchi et al. | |
| 5,544,020 A | 8/1996 | Loeber et al. | |
| 6,025,820 A | 2/2000 | Salmon et al. | |
| 6,120,159 A | 9/2000 | Inoguchi et al. | |
| 6,158,867 A | 12/2000 | Parker et al. | |
| 6,224,222 B1 * | 5/2001 | Inoguchi et al. | 362/29 |
| 6,281,788 B1 | 8/2001 | Noll | |

(Continued)

FOREIGN PATENT DOCUMENTS
EP    0 646 823 A2    4/1995
(Continued)

OTHER PUBLICATIONS
International Search Report for PCT/US2005/035749, date of mailing Feb. 7, 2006, 3 pages.
(Continued)

*Primary Examiner* — Donnie Crosland
(74) *Attorney, Agent, or Firm* — Foley & Lardner LLP

(57) ABSTRACT

An instrument cluster for use in a passenger vehicle includes a translucent sheet. The sheet is located in front of at least one of an appliqué, a display face, and a pointer of the instrument cluster. Indicia are embedded in the translucent sheet. The indicia has a first visual state and a second visual state, the indicia being more noticeable in its second visual state than in its first visual state.

9 Claims, 4 Drawing Sheets

U.S. PATENT DOCUMENTS

| | | | |
|---|---|---|---|
| 6,404,463 B1 * | 6/2002 | Knoll et al. | 349/1 |
| 6,447,131 B1 * | 9/2002 | Thompson et al. | 362/26 |
| 6,454,422 B1 | 9/2002 | Williams | |
| 6,490,776 B1 * | 12/2002 | Gager et al. | 29/458 |
| 6,588,924 B1 | 7/2003 | Friepes | |
| 6,663,252 B1 | 12/2003 | Fong et al. | |
| 6,729,738 B2 * | 5/2004 | Fuwausa et al. | 362/84 |
| 2001/0014023 A1 | 8/2001 | Lange | |
| 2002/0085366 A1 * | 7/2002 | Angell et al. | 362/23 |
| 2002/0186228 A1 | 12/2002 | Kobayashi et al. | |
| 2003/0002273 A1 | 1/2003 | Anderson, Jr. et al. | |
| 2003/0214492 A1 | 11/2003 | Noeth et al. | |
| 2004/0017687 A1 | 1/2004 | Misaras | |

FOREIGN PATENT DOCUMENTS

| | | |
|---|---|---|
| EP | 0 806 633 A2 | 11/1997 |
| FR | 2 760 412 A1 | 9/1998 |
| FR | 2 760 413 A1 | 9/1998 |
| WO | WO 99/23624 A1 | 5/1999 |
| WO | WO 03/020545 A1 | 3/2003 |

OTHER PUBLICATIONS

European Search Report for European Patent Application No. 05802386.2 dated Mar. 9, 2009, 5 pages.

* cited by examiner

INSTRUMENT CLUSTER LENS INFORMATION, TELLTAILS, AND LIGHTING

The present application is a national stage entry under 35 U.S.C. §371 of PCT Patent Application No. PCT/US2005/035749, filed Oct. 5, 2005 and published in English, and claims priority under 35 U.S.C. §119(e) to U.S. Provisional Patent Application No. 60/616,535 filed Oct. 6, 2004. The disclosures of these two applications are hereby incorporated by reference in their entirety.

BACKGROUND

The present application relates generally to the field of display apparatus, and particularly to instrument clusters for vehicles.

Many vehicles include instrument clusters which display various types of information. This information may include instrumentation such as a speedometer, tachometer, fuel level gauge, etc. This information may also include tell-tales such as a seat belt indicator, a low-fuel warning, a check engine warning, an engine temperature warning, an anti-lock brake indicator, a traction control indicator, tire-pressure warnings, and/or other tell-tales. This information may further include turn signal indicators.

Many of the indicators tend to be carried on an appliqué. As more information is to be displayed in the instrument cluster, the appliqué may become crowded. Further, as more information is displayed, more elements need to be added to segregate light of one indicator from another indicator to make sure that the light intended to illuminate the first indicator does not substantially illuminate a second indicator.

The teachings hereinbelow extend to those embodiments which fall within the scope of the appended claims, regardless of whether they address one or more of the above-mentioned problems.

SUMMARY

According to one embodiment, an instrument cluster for use in a vehicle includes a sheet disposed in front of a display face, an appliqué, and/or a pointer of the instrument cluster. The sheet is configured to carry indicia which have a first visual state and a second visual state, the indicia being more noticeable in the second visual state.

According to another embodiment, an instrument cluster is configured such that it displays information at a first level and at a second level in front of the first level. The information at the first level may include at least one of ticker marks, tell-tales, and turn indicators, and information at the second level may include at least one of tell-tales and turn indicators. The instrument cluster may further be configured to display information at a third level. The information at the second level may include a plurality of independently controllable indicia which each have a first visual state and a second visual state, the indicia being more noticeable in the second visual state.

Another embodiment relates to an instrument cluster for use in a passenger vehicle includes a clear sheet. The sheet is located in front of at least one of an appliqué, a display face, and a pointer of the instrument cluster. Indicia is embedded in the translucent sheet. The indicia has a first visual state and a second visual state, the indicia being more noticeable in its second visual state than in its first visual state. In some embodiments, the instrument cluster may include a plurality of independently controllable indicia. Also, in some embodiments, the indicia may switch from the first visual state to the second visual state in response to a change in a monitored vehicle operating condition. Additionally, in some embodiments, the instrument cluster may include a second translucent sheet having a second indicia. Also, in some embodiments, the indicia may be configured to be illuminated by an LED. Additionally, in some embodiments, if a light source is used to illuminate the indicia, the light may enter the sheet at an edge of the sheet. Also, in some embodiments, the entire indicia may be located in proximity to an edge of the sheet. Additionally, in some embodiments, the indicia may represent one of a tell-tale and a turn indicator. Also, in some embodiments, the indicia may be designed to appear three-dimensional. Additionally, in some embodiments, light may be applied to the indicia from a blinded location. Also, in some embodiments, the instrument cluster may include a light guide coupled to the sheet and configured to guide light from a light source to illuminate the indicia. Additionally, in some embodiments, the sheet may be a lens of the instrument cluster.

DETAILED DESCRIPTION OF THE PREFERRED EMBODIMENTS

New techniques may be used to display information in new locations in a vehicle. Particularly, a sheet may have indicia embedded in the sheet that may be switched from one visual state to a second, more noticeable, visual state. The indicia may be embedded in the sheet by etching the sheet, molding imperfections in the sheet, roughing a surface of the sheet, and/or by any number of other techniques such as those discussed below. The switch in visual state may be accomplished by piping light from a light source through the sheet.

The sheet may be translucent, and the sheet may be placed in front of a display face, an appliqué, and/or a pointer of an instrument cluster. The sheet may serve as a lens of the instrument cluster or may be a component other than the lens.

The indicia carried in the sheet may be one, two, or three dimensional. The sheet may be designed to carry a plurality of independently controllable indicia, which may be formed and controlled by one or more different techniques.

Figure 1:
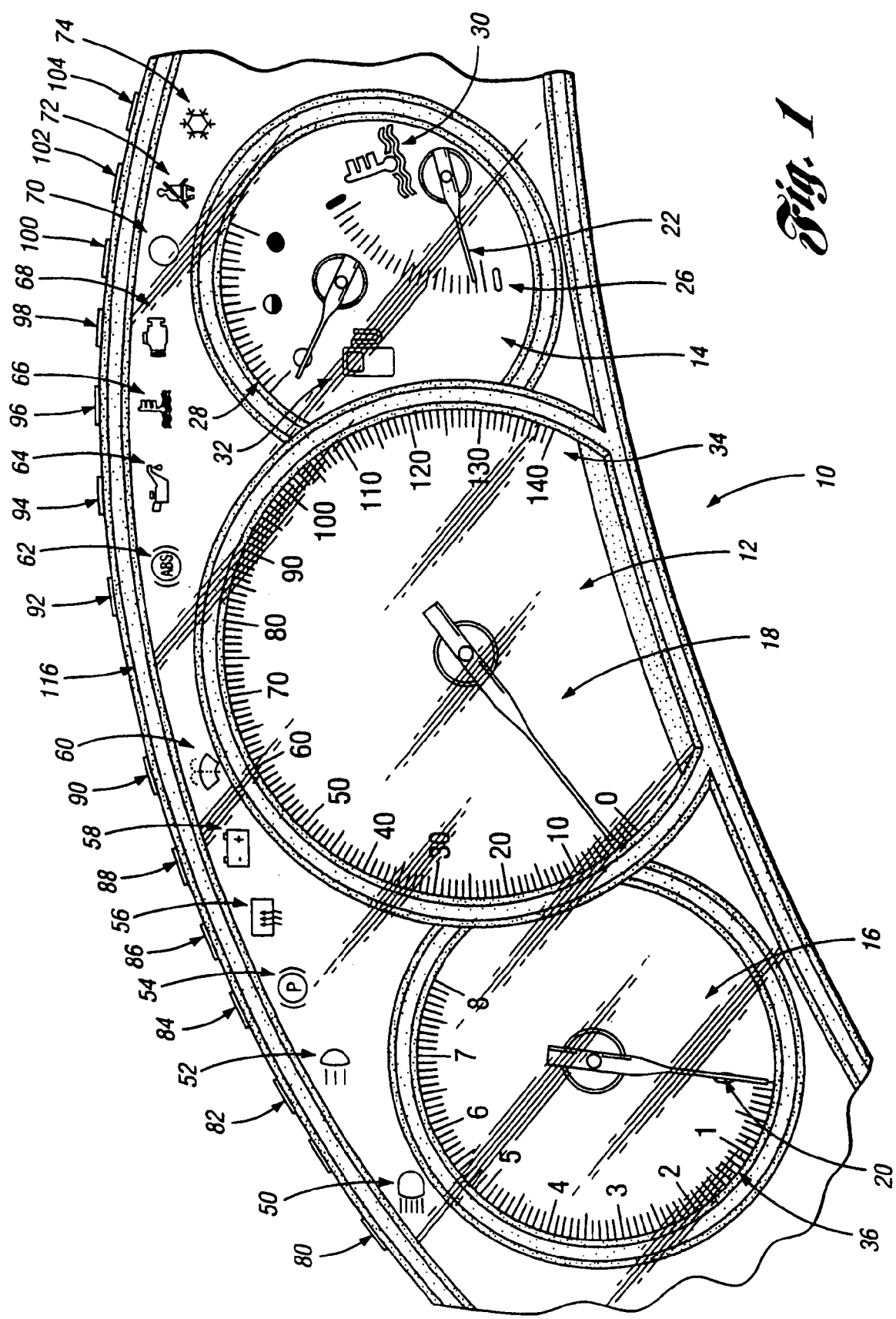
FIG. 1 is a front view of an instrument cluster according to some embodiments.

Referring to FIG. 1, an exemplary instrument cluster 10 comprises display faces 12-16 which contain pointers 18-24 which cooperate with markings 26, 28, 34, 36 to convey information. Pointers 18-24 may be controlled in any known manner, including by way of a stepper motor. The face also includes indicia 30, 32 which may be illuminated to cooperate with markings 26, 28 or to display additional information. Indicia 30, 32 may be part of the same informational display as markings 26, 28, may take the form of tell-tales, or may take some other form. Markings 26, 28, 34, 36 and indicia 30, 32 may be printed on an appliqué or may be provided on display faces 12-16 in some other manner.

Instrument cluster 10 also includes indicia 50-74 which are provided on a sheet (not shown) located in front of display faces 12-16. Indicia 50-74 are illuminated by light sources (not shown). Indicia 50-74 are located on an edge of the sheet (which corresponds to an edge of cluster 10). Light from the light sources is carried to indicia 50-74 by light guides 80-104, respectively. Light guides 80-104 may be a portion of the sheet or may be separate from the sheet. Light guides 80-104 are disposed behind a brow 116. Light guides 80-104 may be angled such that the light enters the sheet transverse to the viewing direction of indicia 50-74 (e.g. into a depth of the sheet where the viewing direction is through a face of the sheet).

When not illuminated, indicia 50-74 may have a first visual state where they are less noticeable. When illuminated, indicia 50-74 may have a second visual state where they are more noticeable. The various indicia 50-74 may be individually switched from the first visual state to the second visual state. Further, certain groups of indicia 50-74 may be configured such that they can be selectively switched from the first visual state to the second visual state at the same time. A light source is preferably selected such that there is a high contrast between the first visual state and the second visual state of indicia 50-74. In one embodiment, the light sources are LEDs.

Indicia 50-74 may be embedded in a translucent sheet by disrupting the form of the sheet to create visual markings that will result in the outward transmission of light that is piped into the translucent sheet. This may be done by etching the sheet, changing the topography of the sheet, embossing the sheet, tool texturing the sheet, transferring an in-mold graphic to the sheet, foil painting the sheet, changing the crystal structure of the sheet, or by some other technique. In one embodiment, indicia 50-74 are added in a molding step when the sheet is formed. Indicia 50-74 may be formed in a translucent sheet in three dimensions (e.g. by laser etching a 3-D image in the sheet) such that a resulting image has a three dimensional appearance. The 3-D image may be formed using a technique similar to that used by 3M or Crystology 3D to form 3D images in other products.

Indicia 50-74 are shown as tell-tales, but may also take the form of tick marks, numbers, graphics (such as a bar graph), turn indicators, or some other indicia. In some embodiments, indicia may be used to create lighting effects (such as edge lighting effects) that do not convey information. If used to form tick marks, the sheet would preferably be located in close proximity to a pointer 16-24 which is cooperating with the tick mark to display information. Indicia 50-74 may be illuminated to have a common color or may be illuminated to have different colors. Further, the multiple indicia may be formed by a common method or by a plurality of different methods.

In some embodiments, the sheet may be configured such that various indicia 50-74 are segregated from each other. This may help lessen an amount of light that pipes through the sheet from one indicia 56 to another indicia 54, 58. Indicia 50-74 may be segregated from each other by using a molded score in the sheet between indicia, a cut line in the sheet between indicia, or by using some other method to create a light resistant area between the indicia. Segregation of the indicia tends to be more necessary when no light guides 80-104 are used to guide light to the sheet (e.g. the light source is mounted in proximity to an entry point of the sheet) or when brighter light sources are used.

Any number of configurations may be used for the sheet. The sheet may be planar, may be non-planar, may be curved, may be rectangular, may be ovular, may be irregularly shaped, may be thick, may be a film, or may take some other form. The sheet may be translucent. The sheet may be formed from plastic, from a polymer, from glass, or from some other material. In one embodiment, a traditional lens of an instrument cluster serves as the sheet, which may be formed from a plastic material and may have a substantially planar form (potentially with some curvature). A clearer sheet would result in better transmission of light. The clarity of the sheet, the light source brightness, and the various other factors would preferably be selected such that a sufficient amount of light can reach the location of the indicia to be illuminated, but such that little or no light from one indicia would be able reach and illuminate other indicia carried by the sheet.

Figure 2:
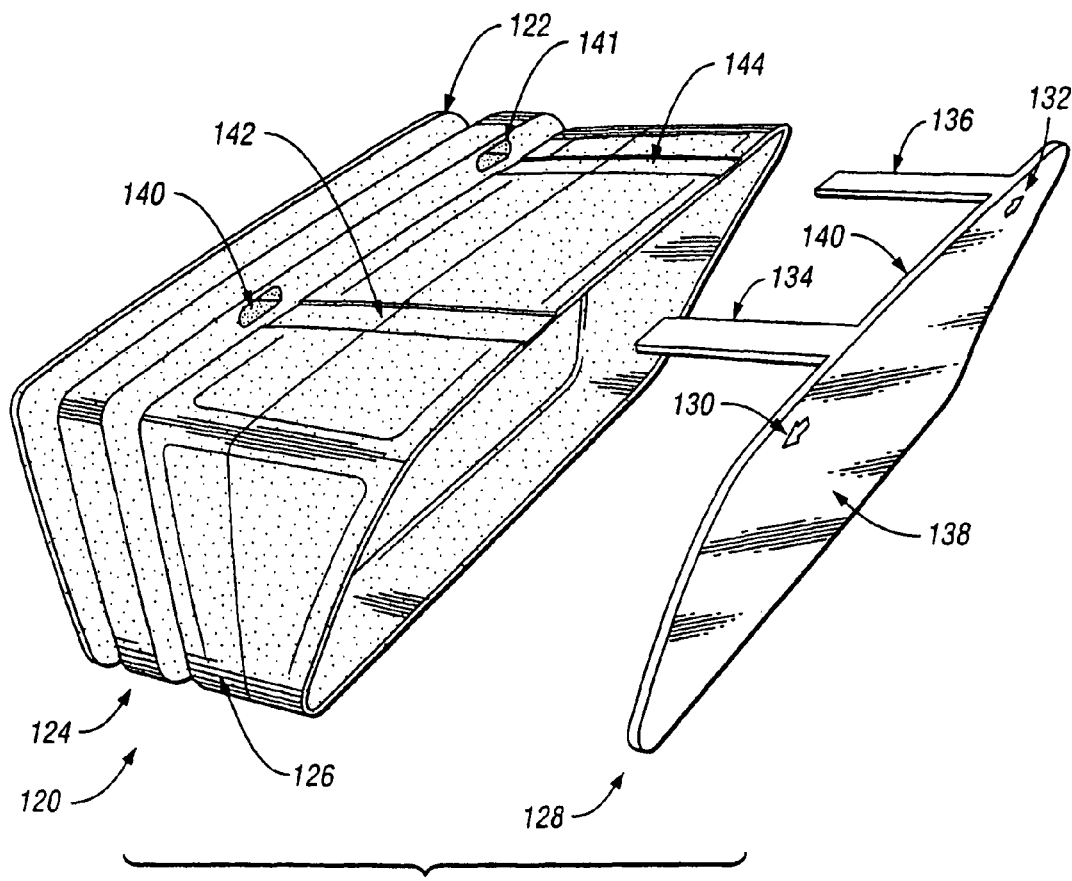
FIG. 2 is an exploded view of an instrument cluster according to some embodiments.

Referring to FIG. 2, an exemplary instrument cluster 120 comprises a circuit board 122, a white box 124, a housing 126, and a lens 128. Lens 128 includes indicia 130, 132 (illustrated as turn indicators) embedded in lens 128. Light guiding fingers 134, 136 are connected to lens 128 (here, they are a portion of lens 128) on a common edge 140 of lens 128 in proximity to indicia 130, 132. Light guiding fingers 134, 136 project from lens 128 in a direction substantially transverse to a face 138 of lens 128. Light guide fingers 142 may extend through spaces in the components between lens 128 and the light source, including valleys 142, 144 in opaque housing 126 and holes 140, 141 in white box 124. As illustrated, valleys 142, 144 and holes 140, 141 may be sized and shaped such that light guide fingers 134, 136 fit snugly in the spaces. Light guiding fingers 134, 136 transfer light from a light source (not shown) mounted on circuit board 122 into edge 140 of lens 128 to illuminate indicia 130, 132.

Figure 3:
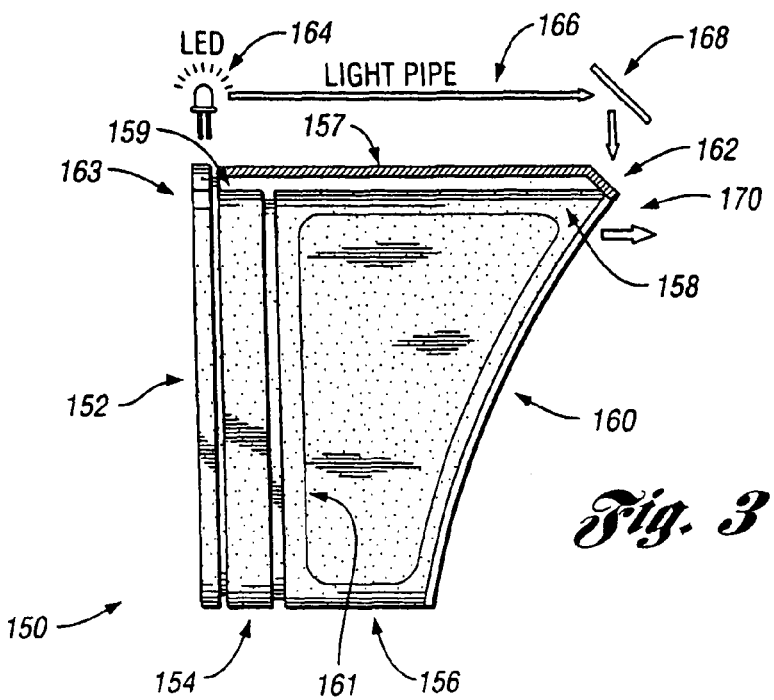
FIG. 3 is a side cut-away view of an instrument cluster according to some embodiments.

Referring to FIG. 3, an exemplary instrument cluster 150 includes a circuit board 152 carrying an LED 163, a white box 154, a housing 156, and a lens 160 having indicia embedded on a face of the lens. Lens 160 has a slight concave curvature.

Lens 160 includes a light guiding finger 158 which extends over housing 156 and through a space 159 in white box 154 to line up with LED 163. An opaque overlay 157 is situated above and in contact with light guide finger 158. Overlay 157 has a brow 162 which is in front of light guide finger 158 and hides light guide finger 158 from view, placing it in a blinded position. Housing 156 may include a back face 161 on which additional information may be display and/or from which a pointer may extend.

Light is radiated 164 from LED 163 and is piped 166 through light guide finger 158. Light from light guide finger 158 enters 168 an edge of lens 160. The light illuminates an indicia embedded in lens 160 which switches the indicia from a first un-illuminated visual state to a second, more noticeable, illuminated visual state 170. In some embodiments, in the first visual state the indicia may be somewhat invisible. Also, in some embodiments, in a first visual state the indicia may appear in the background while in a second visual state the indicia may appear to be more in the foreground.

Figure 4:
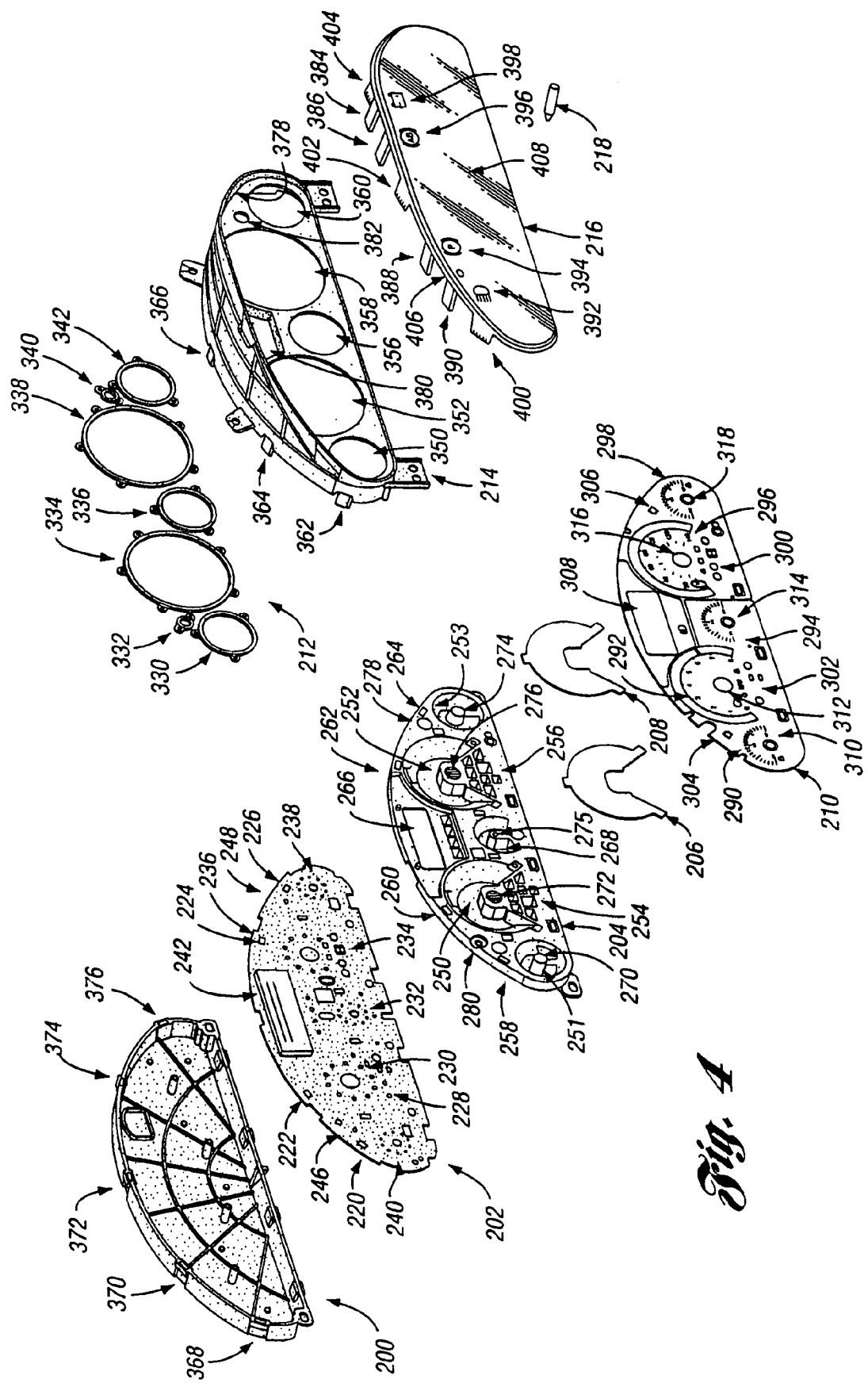
FIG. 4 is a method according to some embodiments.

Referring to FIG. 4, an exemplary instrument cluster 198 comprises a back cover 200, a circuit board 202, a light segregating body 204, an appliqué 210, a bezel 214, and a lens 216. In this embodiment, lens 216 is the sheet which includes indicia 392-398. Light is transferred to indicia 392-398 in lens 216 by way of light guides 384-390 in the form of light transmissive projections from lens 216. Light guides 384-390 extend past bezel 214 behind brow 378. Light guides 384-390 further extend through openings 258-264 in light segregating body 204 and position against light sources 258-264, shown as LEDs, mounted to circuit board 202. Light sources 258-264 may be controlled by a control circuit. The control circuit may be mounted to the same circuit board as the light sources 258-264 or may be located separately.

Light enters lens 216 from light guides 384-390 through the depth/edge 406 of lens 216. This light may be used to selectively illuminate indicia 392-398 such that they are visible by a vehicle occupant from face 408 of lens 216.

Figure 5:
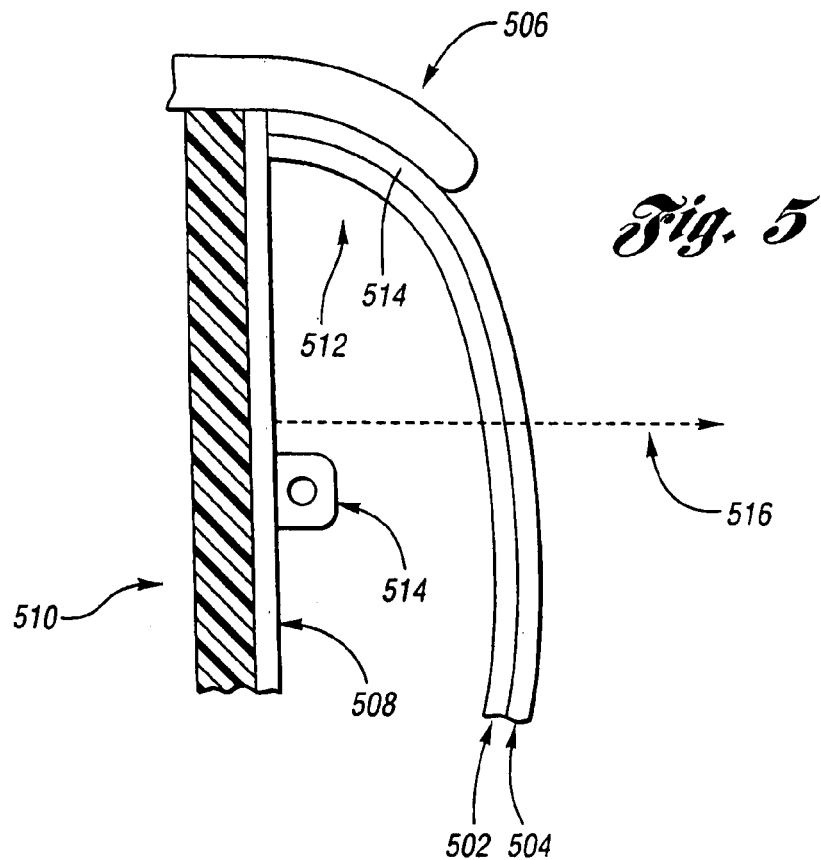
FIG. 5 illustrates a view of an instrument cluster including a first translucent sheet and a second translucent sheet which may each be configured to carry indicia.

Referring to FIG. 5, an instrument cluster 500 includes a first translucent sheet 502 and a second sheet 504 which may each be configured to carry indicia. The indicia of sheet 502 may be located directly behind the indicia of sheet 504, the indicia of sheet 502 may be staggered with respect to the indicia of sheet 504, some of the indicia of sheet 502 may be staggered with respect to the indicia of sheet 504 while others are located directly behind indicia of sheet 504, or some other arrangement may be made.

Appliqué 508 may carry indicia to display additional information. In this manner, instrument cluster may be configured to display information at at least three levels—at the appliqué 508, at the sheet 502, and at the sheet 504. In particular, a line of sight 516 transverse to the face of the instrument cluster will pass through a first level (appliqué 508), a second level (sheet 502), and a third level (sheet 504) of material configured to carry indicia. The indicia on each level may be any of the previously mentioned possibilities. In some embodiments, instrument cluster 500 may be configured to have fewer than three levels. In other embodiments, instrument cluster 500 may be configured to have more than three layers.

Light may be guided to the indicia of sheets 502, 504 from a light source (not shown) mounted on circuit board 510 by fingers 512, 514 which are extensions of sheets 502, 504. In instrument cluster 500, fingers 512, 514 are at least partially hidden from view by brow 506 and may be completely hidden from view by brow 506. Fingers 512, 514 may extend through appliqué 508.

Instrument cluster 500 may also include a pointer 514 which may be configured to cooperate with indicia of appliqué 508, sheet 502, and/or sheet 504 to convey information to a vehicle operator.

Figure 6:
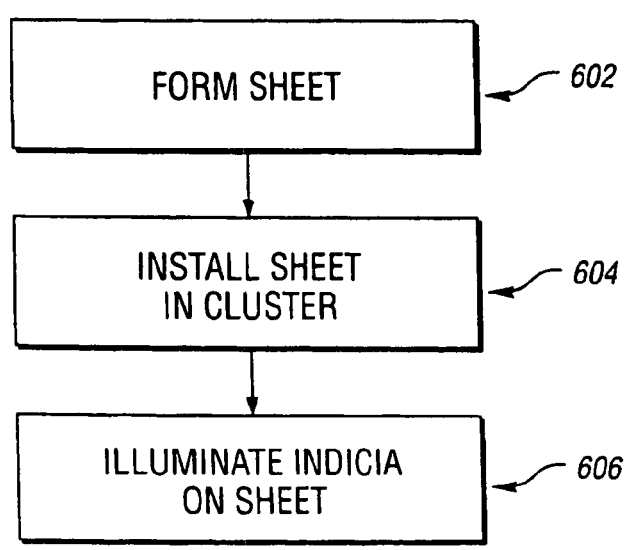
FIG. 6 is a flow chart of a method including the steps of forming a sheet carrying indicia, installing the sheet in an instrument cluster, and illuminating indicia on the sheet.

Referring to FIG. 6, a method includes forming a sheet carrying indicia at block 602, installing the sheet in an instrument cluster at block 604, and illuminating indicia on the sheet at block 606. Forming the sheet at block 602 may include molding the sheet in a manner configured to carry indicia. Forming the sheet at block 602 may include segregating indicia from each other, which may include forming a molded score. Forming the sheet at block 602 may include etching the sheet, changing the topography of the sheet, embossing the sheet, tool texturing the sheet, transferring an in-mold graphic to the sheet, foil painting the sheet, a combination of these steps, or some other step. Additionally, forming the sheet at block 602 may include forming a three dimensional image in the sheet. Also, forming the sheet at block 602 may include attaching light guiding members to the sheet. Forming the sheet at block 602 may include forming one or more than one indicia in proximity to an edge of the sheet.

Installing a sheet to an instrument cluster at block 604 may include coupling the sheet to a light source, which may include connecting fingers of the sheet to light sources. Installing a sheet to an instrument cluster at block 604 may include attaching the sheet (such as in the form of a film) to another object and installing the other object in the instrument cluster. Installing a sheet to an instrument cluster at block 604 may include using a snap connection or clip connection to install the sheet. Installing a sheet to an instrument cluster at block 604 may include connecting a light guide to the sheet. Installing a sheet to an instrument cluster at block 604 may include installing more than one sheet carrying indicia in the instrument cluster, and may include installing more than one level of sheet carrying indicia in the instrument cluster.

Illuminating indicia on the sheet at block 606 may include selectively illuminating one of a plurality of indicia. Illuminating indicia on the sheet at block 606 may include individually illuminating one of a plurality of indicia. Illuminating indicia on the sheet at block 606 may include illuminating the indicia with one or more than one light source. Illuminating indicia on the sheet at block 606 may include illuminating an indicia in response to a value of a measured parameter. Illuminating indicia on the sheet at block 606 may include illuminating the indicia in response to a change in a vehicle condition. Illuminating indicia on the sheet at block 606 may include illuminating the indicia in response to a user input. Illuminating indicia on the sheet at block 606 may include illuminating the indicia based on ignition of the engine (e.g. illuminating tell-tales or display indicia in response to ignition of the engine). Illuminating indicia on the sheet at block 606 may include illuminating the indicia in response to a change in state of an accessory (e.g. radio, air conditioning, heat, interior lamp, navigation system, etc.). Illuminating indicia on the sheet at block 606 is not meant to include incidental illumination (e.g. daylight passing through the sheet, light from illuminated tell-tales from an appliqué located behind the sheet, etc.).

Referring again to FIG. 4, instrument cluster 198 may or may not include any number of other traditional or untraditional features of instrument clusters. Instrument cluster 198 may includes an appliqué 210 having various indicia 290-306 printed on a forward facing face of appliqué 210. Indicia 290-306 may include tick marks and numerical indicia 290-298, tell-tales 300, 302, and/or turn indicators 304, 306. Tick marks and numerical indicia 290-298 are illuminated by light source groups 230, 232, 236-240 (shown as LEDs) mounted on circuit board 202. Spaces 250, 250-253, 268 are provided in opaque light directing housing 204 such that light from the respective groups of light sources are directed towards the tick marks they are configured to illuminate, but do not provide significant amounts of light to other indicia on appliqué 210. Light diffusers 206, 208 may be used to diffuse light from light source groups 230, 236 used to illuminate tick marks and numerical indicia 292, 296. Light sources 228, 234 (shown as LEDs) mounted on circuit board 202 may also be provided, which light sources shine light through various spaces 254, 256 in opaque light directing housing 204 to selectively illuminate one or more indicia of indicia groups 302, 300 on appliqué 210. Light sources 246, 248 (shown as LEDs) may also be provided to illuminate turn indicators 304, 306.

Instrument cluster 198 may also include a digital display 242. Display 242 may be mounted to circuit board 202 (as shown) or may arranged in some other manner. Information from display 242 can be viewed through space 266 in opaque light directing housing 204 and space 308 in appliqué 210.

Instrument cluster 198 may also include pointers (not shown) which extend through openings 270-276 in opaque light directing housing 204 and openings 310-318 in appliqué 210.

Bezel 214 may include separated spaces 350-360, 380, 382 to allow a vehicle occupant to view information from appliqué 210 and display 242. Bezel 214 may alternately have an open design without separated spaces. In one embodiment, bezel 214 may consist essentially of a brow and/or lip. Bezel 214 may also include connectors 362-366 which are configured to allow connection of bezel 214 to back cover 200. Back cover 200 may include corresponding connectors 368-376 which are configured to allow connection of bezel 214 to back cover 200. The connection may be a snap connection or some other type of connection.

Instrument cluster 198 may further include ring system 212 having various openings 230-342 through which information can be viewed, a stem 218 that allows user actuation of a control, and/or other additional components that may serve various other purposes.

Circuit board 202 may be a printed circuit board, may be a flexible circuit board, may be a rigid circuit board, may be a conductive foil, and/or may take some other form.

Vehicles may include aircraft, watercraft, and land vehicles. Land vehicles may include passenger vehicles such as cars, trucks, busses, sport utility vehicles, and vans.

The term 'in front of' is intended to refer to a visual path location with the front being closer in the path to a viewer, and not to refer to the front of the vehicle in which the instrument cluster is to be installed.

Accordingly, the present invention is not limited to a particular embodiment, but extends to various modifications that nevertheless fall within the scope of the claims or the invention as a whole. The various components of the instrument cluster and sheet may be connected or formed in any number of manners and are not limited to the order or arrangement shown in the illustrative embodiments.

What is claimed is:

1. An instrument cluster for use in a passenger vehicle, the instrument cluster comprising:
    a translucent sheet located at a first level of the instrument cluster;
    a display face and a pointer of the instrument cluster located at a second level relative to the first level, the instrument cluster configured such that the first level is closer to an occupant of the vehicle than the second level when the instrument cluster is mounted in the vehicle; and
    a plurality of independently controllable indicia carried by the translucent sheet, each of the indicia having a first visual state and a second visual state where the indicia is more noticeable in its second visual state than in its first visual state;
    a light source located at a third level behind the display face; and
    a light guide finger extending from an edge of the translucent sheet and through a plane formed by the display face, the light guide finger configured to guide light from the light source to the translucent sheet, wherein the display face and an opaque housing piece hide the light source and the light guide finger from view by the occupant.

2. The instrument cluster of claim 1, wherein at least one of the plurality of indicia switches from the first visual state to the second visual state in response to a change in a vehicle operating condition.

3. The instrument cluster of claim 1, wherein the light guide finger extends from the edge of the translucent sheet in a direction substantially transverse to a face of the translucent sheet.

4. The instrument cluster of claim 1, wherein at least one entire indicia of the plurality of indicia is located in proximity to an edge of the sheet.

5. The instrument cluster of claim 1, wherein at least one of the plurality of indicia represents at least one of a turn indicator, a tell-tale, and a three-dimensional indicia.

6. The instrument cluster of claim 1, wherein the translucent sheet is spaced apart from the display face, and wherein the light guide finger spans the space by extending from an edge of the translucent sheet and over a portion of the opaque housing piece.

7. An instrument cluster for use in a passenger vehicle, the instrument cluster comprising:
    a translucent sheet, the translucent sheet not located behind a display face and a pointer;
    an indicia carried by the translucent sheet, the indicia configured to comprise a first visual state and a second visual state where the indicia is more noticeable in its second visual state than in its first visual state;
    wherein the indicia switches from the first visual state to the second visual state in response to a change in a vehicle operating condition;
    a light source located behind the translucent sheet, pointer, and display face; and
    a light guide extending from an edge of the translucent sheet, through a plane formed by the display face, and receiving light from the light source; wherein the light source and the light guide are hidden from view by an opaque piece of housing for the instrument cluster.

8. An instrument cluster for use in a passenger vehicle, the instrument cluster comprising:
    a translucent sheet located in the instrument cluster;
    an indicia carried by the translucent sheet, the indicia configured to comprise a first visual state and a second visual state where the indicia is more noticeable in its second visual state than in its first visual state; and
    a light source configured to illuminate the indicia;
    a light guide extending from an edge of the translucent sheet and away from the viewing plane of the translucent sheet in the instrument cluster;
    wherein the instrument cluster is configured such that light from the light source is provided to the light guide and is thereby provided to the translucent sheet at the edge of the translucent sheet.

9. An instrument cluster for use in a passenger vehicle, the instrument cluster comprising:
    a translucent sheet located in front of a display face in the instrument cluster; and
    graphic information carried by the translucent sheet, the graphic information configured to comprise a first visual state and a second visual state where the graphic information is more noticeable in its second visual state than in its first visual state; and
    a light guide coupled to the edge of the translucent sheet and extending away from the translucent sheet and into the instrument cluster, the light guide configured to guide light from a light source hidden from view in the instrument cluster to illuminate the graphic information.

\* \* \* \* \*